US006354082B1

(12) United States Patent
Brieschke

(10) Patent No.: US 6,354,082 B1
(45) Date of Patent: Mar. 12, 2002

(54) AIR/WATER INTENSIFIER

(75) Inventor: Todd M. Brieschke, Temperance, MI (US)

(73) Assignee: Aries Engineering Company, Inc., Dundee, MI (US)

( * ) Notice: Subject to any disclaimer, the term of this patent is extended or adjusted under 35 U.S.C. 154(b) by 0 days.

(21) Appl. No.: 09/474,636

(22) Filed: Dec. 29, 1999

(51) Int. Cl.[7] .............................................. B60T 13/00

(52) U.S. Cl. ........................................ 60/560; 60/547.1

(58) Field of Search .......................... 60/560, 563, 567, 60/575, 574, 576, 577, 583; 92/86

(56) References Cited

U.S. PATENT DOCUMENTS 4,439,986 A * 4/1984 Snitgen ..................... 60/547.1
5,178,400 A * 1/1993 Singh ......................... 277/177
5,526,644 A 6/1996 Brieschke .................... 60/565
5,582,009 A 12/1996 Brieschke ................... 60/560
5,865,029 A 2/1999 Brieschke .................... 60/560

* cited by examiner

*Primary Examiner*—John E. Ryznic
(74) *Attorney, Agent, or Firm*—MacMillan, Sobanski & Todd, LLC

(57) ABSTRACT

An intensifier type of fluid actuator using air and water as working fluids therein includes first and second bodies that can be separate components or incorporated into a single structure. The first body includes a first manifold connected by a first tube to a second manifold to define an intensifier chamber, a third manifold connected by a second tube to the second manifold to define a reservoir chamber, and a fourth manifold connected by a third tube to the third manifold to define a work chamber. An intensifier piston is disposed within the intensifier chamber and has an outer surface in sealing and sliding engagement with the first tube. The intensifier rod is secured to the intensifier piston and extends through the second manifold into the reservoir chamber. The intensifier rod is movable through the third manifold into the work chamber. A reservoir piston is disposed within the reservoir chamber and has an outer surface in sealing and sliding engagement with the second tube. The reservoir piston includes an opening formed therethrough. The intensifier rod extends through the opening formed in the reservoir piston. The reservoir piston separates the reservoir chamber to define a water reservoir chamber and an air reservoir chamber in selective communication with a source of air. The second body includes a fifth manifold connected by a fourth tube to a sixth manifold to define a piston chamber. A work piston is disposed within the piston chamber and has an outer surface in sealing and sliding engagement with the fourth tube. A work rod is secured to the work piston and extends through the sixth manifold from the second body. A plurality of ports are provided for selectively providing pressurized fluid in the intensifier chamber, the reservoir chamber, the first work chamber, and the piston chamber to selectively extend the work rod into engagement with the workpiece. Water is used as the working fluid in the fluid reservoir chamber and the work chamber to eliminate any contamination issues if any leaks occur.

16 Claims, 4 Drawing Sheets

AIR/WATER INTENSIFIER

BACKGROUND OF THE INVENTION

This invention relates in general to fluid actuators for causing movement of a piston relative to a cylinder. In particular, this invention relates to an intensifier type of fluid actuator using air and water as working fluids.

Fluid actuators are well known devices which are adapted to generate mechanical movement in response to the application of pressurized fluid, such as air or oil. A basic fluid actuator includes a hollow cylinder having a piston slidably disposed therein. The outer circumferential surface of the piston slidably and sealingly engages the inner circumferential surface of the cylinder so as to divide the interior of the cylinder into first and second chambers. When a pressurized fluid is supplied to the first chamber and the second chamber is vented, a pressure differential is created across the piston. This pressure differential causes the piston to slide relative to the cylinder in a first direction. Similarly, when a pressurized fluid is supplied to the second chamber and the first chamber is vented, the pressure differential created across the piston causes it to slide relative to the cylinder in a second direction. One or more fluid valves are usually provided to control the supply of pressurized fluid to and the venting of the two chambers of the cylinder so as to effect movement of the piston in a desired manner.

Typically, a rod is connected to the piston for movement therewith. The rod extends outwardly from the cylinder into engagement with a workpiece. Thus, when the piston is moved within the cylinder as described above, the workpiece is moved therewith. The magnitude of the force which is generated against the workpiece is equal to the product of the pressure of the fluid in the chamber and the surface area of the piston exposed to that pressurized fluid. Thus, for example, if the magnitude of the pressurized fluid is one hundred pounds per square inch (p.s.i.) and the surface area of the piston is two square inches, then the magnitude of the force exerted by the piston against the workpiece will be two hundred pounds. Fluid actuators of this general type are commonly used in a variety of applications.

In some applications, however, the magnitude of the pressurized fluid available for use by the fluid actuator is limited. For example, in a typical manufacturing facility, pressurized air may be generated by a central supply system at a standard pressure, such as one hundred p.s.i., for the entire facility. At the same time, the magnitude of the force necessary for the fluid actuator to perform a given task may be relatively large, such as one thousand pounds. If a basic fluid actuator structure as described above were to be used to perform this task, the piston would have to very large (ten square inches in this example) in order to generate the necessary force. Obviously, it is undesirable from several standpoints to provide such a physically large piston.

To address the problem of generating relatively large forces using limited fluid pressures and relatively small pistons, it is known to modify the basic fluid actuator structure to generate an increased amount of force. These modified fluid actuator structures, which are commonly referred to as intensifiers, use multiple interacting pistons to multiply the forces produced by the pressurized fluid against the pistons, while maintaining relatively small sizes for the pistons. A typical intensifier structure includes a cylinder which is divided by an internal manifold into two working areas. In the first working area, a first piston is provided which divides the interior thereof into first and second chambers. A rod extends from the first piston through the manifold into the second working area. In the second working area, a second piston is provided which divides the interior thereof into first and second chambers.

When pressurized fluid is supplied to the first chamber of the first working area, a first force is generated against the first piston as described above. Movement of the first piston causes corresponding movement of the first rod in the first chamber of the second working area. The first chamber of the second working area is filled with oil which is a relatively incompressible liquid. Thus, a second force is generated against the second piston because of the movement of the rod. The rod has a much smaller surface area than the first piston. Thus, the magnitude of the pressure generated in the first chamber of the second area against the second piston is multiplied relative to the original pressure exerted against the first piston. This multiplied pressure is applied against the surface area of the second piston and generates a multiplied force. A second rod connected to the second piston transmits the multiplied force to a workpiece.

The pressurized fluid that is supplied to the first chamber of the first working area is usually a gaseous fluid, with ambient air being the most common used gaseous fluid. Traditionally, a lubricating oil has been used for the non-compressible fluid in the other working chambers of the intensifier. The use of oil as such a working fluid has the advantage of lubricating various elastomeric seals that are disposed about the movable pistons and the inner walls of the various structures defining the chambers for proper sealing therebetween. In such known intensifiers, one or more helical grooves have been formed in the inner walls to trap oil therein to lubricate the seals as they travel over the grooves. The grooves are formed having such a depth as to trap a sufficient amount of oil therein to enable lubrication, yet small enough not to allow significant leaks around the seals between adjacent chambers. For example, it is known to form such grooves having a depth in the range of from about ten microns to about fifteen microns for sufficient use with oil. The use of oil as a working fluid also helps protect against corrosion for the internal metallic structures of the intensifier. Thus, the intensifier can be made with relatively inexpensive metal, such as conventional steel alloys, which may be susceptible to corrosion absent the presence of oil.

However, the use of known air/oil intensifiers in certain applications, such as in food preparation or medical equipment applications, has not met with great success. This is apparently the result of fear of contamination of the products being manipulating resulting from the leakage of the oil from the intensifier. Although the occurrences of such leaks are very rare, the use of known air/oil intensifiers in these and other applications have met with resistance from customers. The use of external shields and other devices are expensive, bulky, and generally difficult to use. Thus, it would be desirable to provide an improved structure for an intensifier that avoids the use of oil as a working fluid.

SUMMARY OF THE INVENTION

This invention relates to an intensifier type of fluid actuator using air and water as working fluids therein. The intensifier includes first and second bodies that can be separate components or incorporated into a single structure. The first body includes a first manifold connected by a first tube to a second manifold to define an intensifier chamber, a third manifold connected by a second tube to the second manifold to define a reservoir chamber, and a fourth manifold connected by a third tube to the third manifold to define a work chamber. An intensifier piston is disposed within the intensifier chamber and has an outer surface in sealing and sliding engagement with the first tube. The intensifier rod is secured to the intensifier piston and extends through the second manifold into the reservoir chamber. The intensifier rod is movable through the third manifold into the work chamber. A reservoir piston is disposed within the reservoir chamber and has an outer surface in sealing and sliding engagement with the second tube. The reservoir piston includes an opening formed therethrough. The intensifier rod extends through the opening formed in the reservoir piston. The reservoir piston separates the reservoir chamber to define a water reservoir chamber and an air reservoir chamber in selective communication with a source of air. The second body includes a fifth manifold connected by a fourth tube to a sixth manifold to define a piston chamber. A work piston is disposed within the piston chamber and has an outer surface in sealing and sliding engagement with the fourth tube. A work rod is secured to the work piston and extends through the sixth manifold from the second body. A plurality of ports are provided for selectively providing pressurized fluid in the intensifier chamber, the reservoir chamber, the first work chamber, and the piston chamber to selectively extend the work rod into engagement with the workpiece. Water is used as the working fluid in the fluid reservoir chamber and the work chamber to eliminate any contamination issues if any leaks occur.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
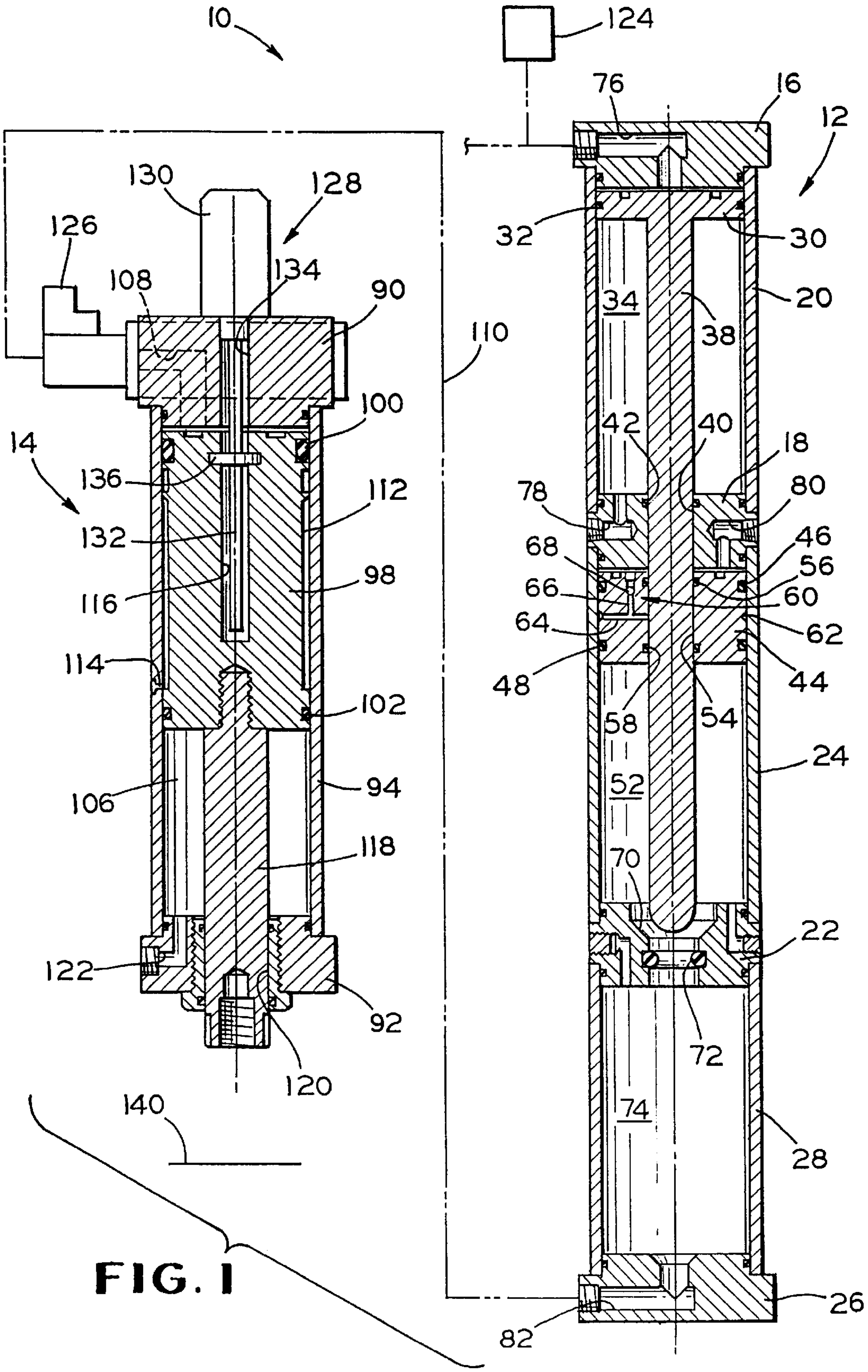
FIG. 1 is a sectional elevational view of an intensifier cylinder in accordance with this invention shown in a first operating position.
Figure 2:
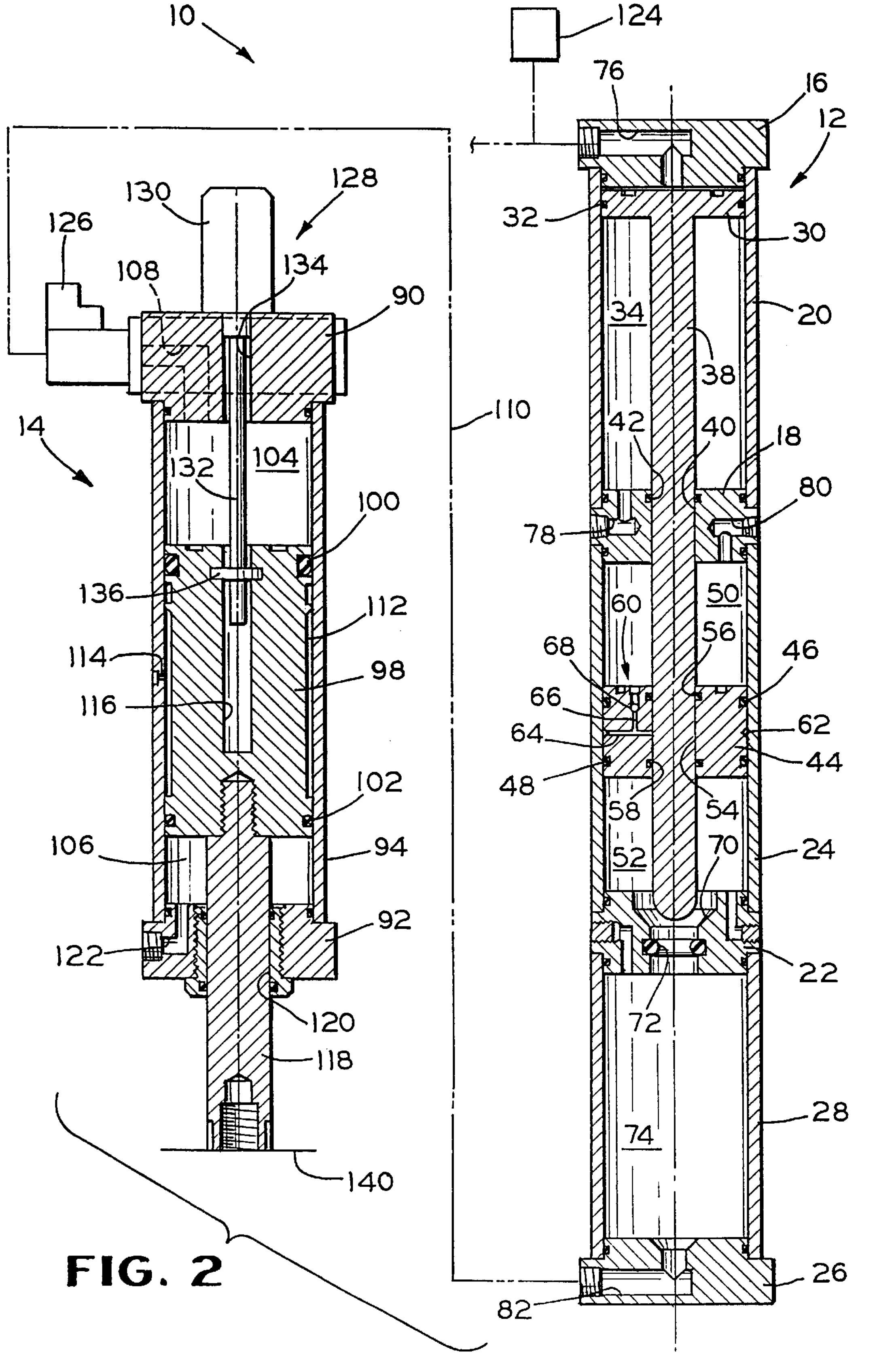
FIG. 2 is a sectional elevational view of the intensifier cylinder illustrated in FIG. 1 shown in a second operating position.
Figure 3:
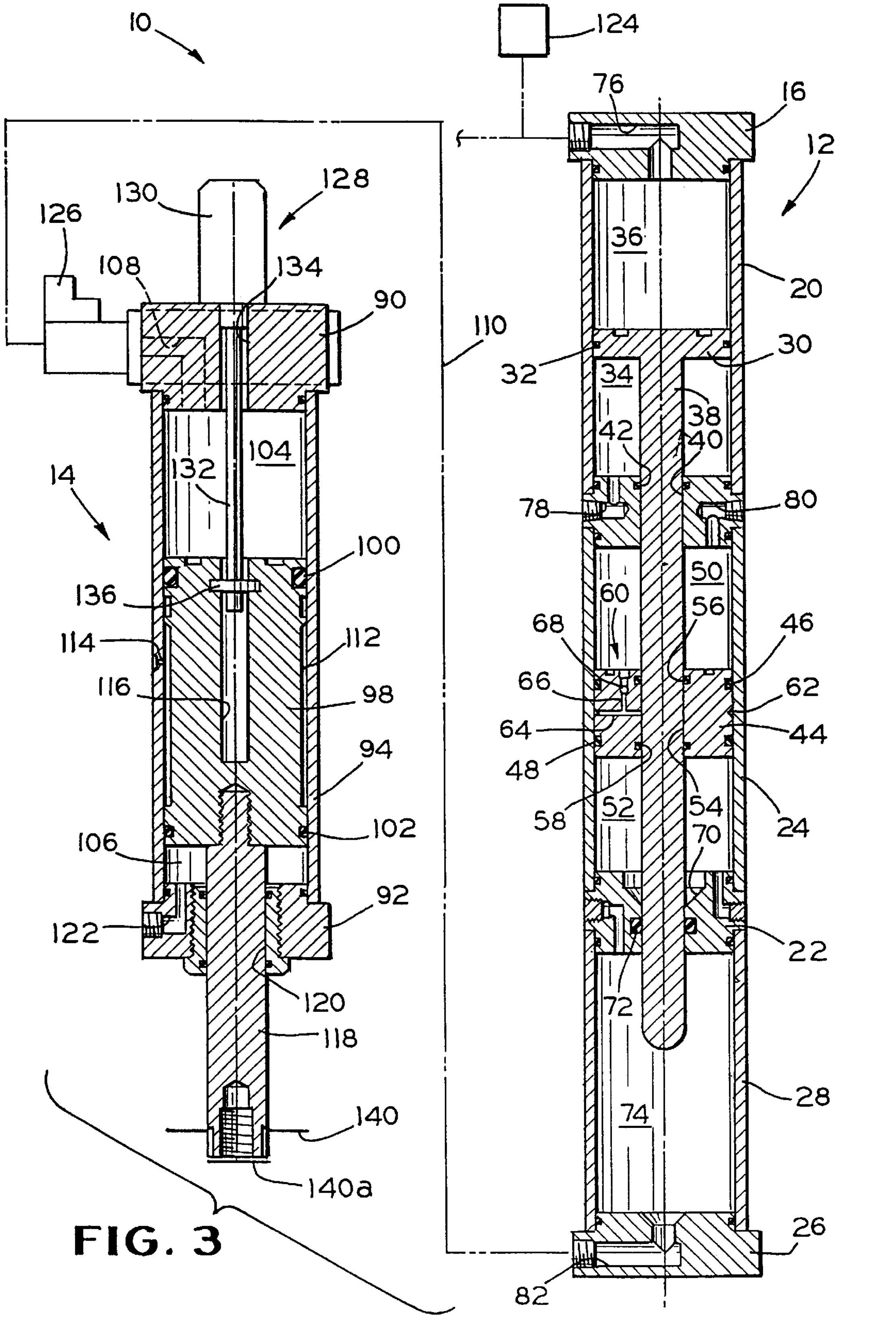
FIG. 3 is a sectional elevational view of the intensifier cylinder illustrated in FIGS. 1 and 2 shown in a third operating position.

Referring now to the drawings, there is illustrated in FIG. 1 an intensifier, indicated generally at 10, in accordance with this invention. The intensifier 10 includes first and second stationary cylindrical bodies 12 and 14 which provide rigid support during operation. The first and second stationary cylindrical bodies 12 and 14 can be separate components, such as shown in FIGS. 1 through 3, or can be incorporated together into a single body. Preferably, the first and second stationary cylindrical bodies 12 and 14 are separate components, the reason for which will be explained in detail below.

The first body 12 of the intensifier 10 includes a first manifold 16 and a second manifold 18 which are connected together by a first hollow cylindrical tube 20. As will be discussed in greater detail below, the first manifold 16, the second manifold 18, and the first tube 20 cooperate to define an intensifier chamber for the intensifier 10. The first body 12 of the intensifier 10 further includes a third manifold 22 which is connected to the second manifold 18 by a second hollow cylindrical tube 24. As will be discussed in greater detail below, the second manifold 18, the third manifold 22, and the second tube 24 cooperate to define a reservoir chamber for the intensifier 10. The first body 12 of the intensifier 10 further includes a fourth manifold 26 which is connected to the third manifold 22 by a third hollow cylindrical tube 28. As will be discussed in greater detail below, the third manifold 22, the fourth manifold 26, and the third tube 28 cooperate to define a work chamber for the intensifier 10.

An intensifier piston 30 is disposed within the intensifier chamber for sliding movement relative thereto. The intensifier piston 30 is generally cylindrical in shape, having an annular groove formed in the outer circumferential surface thereof. A seal 32 is disposed within the groove for sealingly engaging the inner circumferential surface of the first tube 20. Thus, the intensifier piston 30 divides the intensifier chamber into an intensifier retract chamber 34 and an intensifier advance chamber 36 (see FIG. 3). The intensifier retract chamber 34 is defined between the intensifier piston 30, the first tube 20, and the second manifold 18. The intensifier advance chamber 36 is defined between the first manifold 16, the first tube 20, and the intensifier piston 30. An intensifier piston rod 38 is connected to the intensifier piston 30 for movement therewith. The intensifier piston rod 38 extends substantially parallel to the longitudinal axis of the first body 12 of the intensifier 10, through a co-axial opening 40 formed through the second manifold 18, and into the reservoir chamber. A seal 42 provided within a groove formed in the opening 40 of the second manifold 18 prevents fluid communication between the intensifier chamber and the reservoir chamber.

A reservoir piston 44 is disposed within the reservoir chamber for sliding movement relative to the first body 12 of the intensifier 10. First and second seals 46 and 48 are disposed in respective annular grooves formed in the outer circumferential surfaces of the opposed ends of the reservoir piston 44. The seals 46 and 48 sealingly engaging the inner circumferential surface of the second tube 24. Thus, the reservoir piston 44 divides the reservoir chamber into a reservoir air chamber 50 (see FIGS. 2 and 3) and a reservoir water chamber 52. As will be discussed below, various chambers of the intensifier 10 are supplied with either air or water as the working fluid therein, in accordance with the present invention. The reservoir air chamber 50 is defined between the second manifold 18, the second tube 24, and the reservoir piston 44. The reservoir water chamber 52 is defined between the reservoir piston 44, the second tube 24, and the third manifold 22. The reservoir piston 44 is generally cylindrical in shape, having a co-axial bore 54 formed therethrough. The intensifier piston rod 38 extends completely through this co-axial bore 54. Seals 56 and 58 are disposed within respective grooves formed in the bore 54 for sealingly engaging the outer circumferential surface of the intensifier piston rod 38.

A check valve assembly, indicated generally at 60, is provided within the reservoir piston 44. The check valve assembly 60 includes an annular groove 62 formed in the outer circumferential surface of the reservoir piston 44. A radial bore 64 is formed through the reservoir piston 44, extending from the annular groove 62 to a portion of the co-axial bore 54 located between the seals 56 and 58. Thus, the annular groove 62 communicates with an inner annular space defined between the seals 56 and 58 of the reservoir piston 44 and the intensifier piston rod 38. An axial bore 66 extends through the reservoir piston 44 from the radial bore 64 to the end of the reservoir piston 44 adjacent to the second manifold 18. A check valve 68, such as a spring loaded ball-type check valve, is located within the axial bore 66. The check valve 68 permits the one-way flow of fluid through the check valve assembly 60 from the radial bore 64 to the reservoir air chamber 50.

A chamfered bore 70 is formed co-axially through the third manifold 22 for slidably receiving the intensifier piston rod 38. A seal 72 is disposed within a portion of the bore 70 for selectively sealingly engaging the outer circumferential surface of the intensifier piston rod 38. The purpose for this sealing engagement will be explained below. As mentioned above, the work chamber 74 is defined between the third manifold 22, the third tube 28, and the fourth manifold 26. The work chamber 74 communicates with the reservoir water chamber 52 through the chamfered bore 70 and, thus, is also filled with water.

The first body 12 of the intensifier 10 includes a number of ports for effecting the operation thereof. A first port 76 is formed through the first manifold 16 and communicates with the intensifier advance chamber 36. A second port 78 is formed through the second manifold 18 and communicates with the intensifier retract chamber 34. A third port 80 is also formed through the second manifold 12 and communicates with the reservoir air chamber 33. A fourth port 82 is formed through the fourth manifold 26 and communicates with the reservoir air chamber 50. As is well known in the art, the ports 76, 78, and 80 communicate through conventional valves (not shown) with either a source of pressurized fluid (typically pressurized air) or with the atmosphere to effect the operation of the intensifier 10. As will be described in detail below, the fourth port 82 communicates with a portion of the second body 14 of the intensifier.

The second body 14 of the intensifier 10 includes a fifth manifold 90 and a sixth manifold 92 which are connected together by a fourth hollow cylindrical tube 94. The fifth manifold 90, the sixth manifold 92, and the fourth tube 94 cooperate to define a piston chamber. A work piston 98 is disposed within the piston chamber for sliding movement relative to the second body 14. The work piston 98 is generally cylindrical in shape. First and second seals 100 and 102 are disposed in respective annular grooves formed in the outer circumferential surface of the opposed ends of the work piston 98. The seals 100 and 102 sealingly engage the inner circumferential surface of the fourth tube 94. Thus, the work piston 98 divides the piston chamber into a piston water chamber 104 (see FIGS. 2 and 3) and a piston air chamber 106. The piston water chamber 104 is defined between the work piston 98, the fourth tube 94, and the fifth manifold 90. The piston air chamber 106 is defined between the work piston 98, the fourth tube 94, and the sixth manifold 92. The piston water chamber 104 is in fluid communication with the work chamber 74 by means of a fluid conduit (indicated in phantom lines at 110) extending between the fourth port 82 of the fourth manifold 26 and a fifth port 108 formed through the fifth manifold 90.

The work piston 98 has an annular recess 112 formed in the central portion of the outer circumferential surface thereof. The recess 112 defines an outer annular space between the work piston 98 and the fourth tube 94. A vent bore 114 is formed through the wall of the fourth tube 94. As shown in FIGS. 1, 2, and 3, the work piston 98 is positioned such that the vent bore 114 extends through and communicates with the outer annular space defined on the work piston 98 to vent it to the atmosphere. The annular recess 112 and the vent bore 114 are provided because it is desirable to have the air gap defined by the recess 112 between the seals 100 and 102 vented to atmosphere during the stroke of the work piston 98. Thus, the axial length of the recess 112 is preferably sized to match the maximum stroke length of the work piston 98. A co-axial counterbore 116 is formed in the end of the work piston 98 adjacent the fifth manifold 90, the reason for which will be explained below. A work piston rod 118 is connected to the work piston 98 for movement therewith. The work piston rod 118 extends substantially parallel to the longitudinal axis of the second body 14 through a co-axial opening 120 formed through the sixth manifold 92 out of the second body 14. Any one of a number of conventional tools may be connected to the end of the work piston rod 118, as is well known in the art. A sixth port 122 is formed through the sixth manifold 92 and communicates with the piston air chamber 106. The sixth port 122 communicates through conventional valves (not shown) with either a source of pressurized fluid (typically pressurized air) or with the atmosphere to effect the operation of the intensifier 10.

The intensifier 10 can include several optional sensors for generating electrical signals which are representative of various operational characteristics of the intensifier 10. An air pressure sensor, represented schematically at 124, communicates with the first port 76 of the first body 12 of the intensifier 10. The air pressure sensor 124 measures the pressure of the air supplied within the intensifier advance chamber 36 from the source of pressurized fluid, as discussed above. The intensifier 10 can also further include an optional flow rate sensor 126 mounted on the fifth manifold 90 of the second body 14. The flow rate sensor 126 is provided in the fluid conduit 110 between the fourth port 82 of the first body 12 and the fifth port 108 of the second body 14. The flow rate sensor 126 measures the rate of the water flowing between the work chamber 74 and the piston water chamber 104.

The intensifier 10 may further include a position sensor, indicated generally at 128, for measuring the position of the work piston 98 relative to the second body 14 of the intensifier 10. Although any conventional position sensor may be used, the position sensor 128 is preferably a linear variable resistance displacement transducer including a body 130 mounted on the fifth manifold 90 of the second body 14. An elongated mandrel 132 extends outwardly from the body 130. The mandrel 132 extends through a bore 134 formed through the fifth manifold 90 and into the counterbore 116 formed in the work piston 98. The mandrel 132 is fixed in position relative to the body 130 and the fifth manifold 90. A conventional electrical resistance element (not shown) is secured to the mandrel 132. A wiper 136 is secured to the work piston 98 for axial movement therewith. The wiper 136 is mounted for a sliding electrical engagement across the resistance element secured to the mandrel 132. By means well known in the art, the displacement transducer 128 can sense the position of the wiper 136 with respect to the mandrel 132. Because the wiper 136 reciprocates axially with the work piston 98, the axial position of the work piston 98 with respect to the second body 14 can be determined by the position sensor 128.

The operation of the intensifier 10 will now be described. The intensifier 10 is initially disposed in the retracted position illustrated in FIG. 1. In this position, the intensifier piston 30 is disposed adjacent to the first manifold 16, the reservoir piston 44 is disposed adjacent to the second manifold 18, and the work piston 98 is disposed adjacent to the fifth manifold 90. As a result, the work piston rod 118 is, for the most part, retracted within the piston air chamber 106. To begin an advance stroke, pressurized air is supplied through the second port 78 to the intensifier retract chamber 34 and through the third port 80 to the reservoir air chamber 50. As a result, the intensifier piston 30 is urged upwardly to maintain its position adjacent to the first manifold 16, while the reservoir piston 44 is urged downwardly toward the third manifold 22, as shown in FIG. 2. As the reservoir piston 44 advances downwardly, water in the reservoir water chamber 52 is displaced through the opening 70 into the work chamber 74. Simultaneously, the water in the work chamber 74 is displaced through the fourth port 82, the fluid conduit 110, and the fifth port 108 into the piston water chamber 104. As a result, the work piston 98 and the work piston rod 118 are advanced downwardly until the leading end of the work piston rod 118 engages a workpiece 140. Inasmuch as there is virtually no resistance to this initial downward movement until the work piston rod 118 engages the workpiece 140, the advance stroke of the work piston rod 118 occurs relatively rapidly. FIG. 2 illustrates the positions of the various components of the intensifier 10 after the completion of the advance stroke.

After the advance stroke is completed, a work stroke is initiated. To begin the work stroke, pressurized air is continued to be supplied through the third port 80 to reservoir air chamber 50. However, pressurized air is then supplied through the first port 76 to the intensifier advance chamber 36, while the intensifier retract chamber 34 is vented to the atmosphere through the second port 78. The pressurized air in the intensifier advance chamber 36 reacts against the intensifier piston 30 to generate a first force. As a result, the intensifier piston 30 is advanced downwardly toward the is second manifold 18. As the intensifier piston 30 advances, the intensifier piston rod 38 moves into through the opening 70 and into engagement with the seal 72. When this occurs, the work chamber 74 and the piston water chamber 104 are sealed, and the volume of water contained therein is fixed. Further advancement of the intensifier piston rod 38 into the work chamber 74 causes a second pressure to be exerted by the water against the work piston 98. The pressurized water in the piston water chamber 104 reacts against the work piston 98 to generate a second force. This second force is greater than the first force because the net area of the intensifier piston rod 38 is smaller than the net area of the work piston 98. As a result, the work piston 98 is advanced downwardly toward the fifth manifold 92, and the work rod 118 is moved with a relatively large force toward the workpiece 140. For example, if a conventional punch tool is secured to the lower end of the work piston rod 118, a cut-out 140*a* can be formed as shown in FIG. 3 at the completion of the work stroke. FIG. 3 illustrates the positions of the various components of the intensifier 10 after the completion of the work stroke.

Thus, it can be seen that during the work stroke of the intensifier 10, the magnitude of the force exerted by the work piston rod 118 against the workpiece 140 is proportional to the magnitude of the air pressure within the intensifier advance chamber 36. This is because the magnitude of the first force F1 generated by the intensifier piston 30 is equal to the product of the magnitude of the pressurized air P1 in the intensifier advance chamber 36 and the net area A1 of the intensifier piston 30. Similarly, the magnitude of the second force F2 generated by the work piston 98 and the attached work piston rod 118 is equal to the product of the magnitude of the pressurized water P2 in the piston water chamber 104 and the net area A2 of the work piston 98. However, the magnitude of the pressurized water P2 in the piston water chamber 104 is equal to the magnitude of the first force F1 exerted by the intensifier piston 30 through the intensifier piston rod 38 divided by the net area A3 of the end of the intensifier piston rod 38 presented within the work chamber 74. Consequently, the magnitude of the second force F2 generated by the work piston 98 is equal to the product of the magnitude of the first force F1 and the net area A2 of the work piston 98, divided by the net area A3 of the end of the intensifier piston rod 38 presented within the work chamber 74. Substituting the initial calculation for the magnitude of the first force F1, it can be seen that the magnitude of the second force F2 generated by the work piston 98 is equal to the product of (1) the magnitude of the pressurized air P1 in the intensifier advance chamber 36, (2) the net area A1 of the intensifier piston 30, and (3) the net area A2 of the work piston 98, all of which divided by the net area A3 of the end of the intensifier piston rod 28 presented within the work chamber 74. These calculations mathematically illustrate the force intensifying action of the intensifier 10.

To retract the work piston rod 118 within the piston air chamber 106 after completion of the work stroke, the intensifier advance chamber 36 is vented to the atmosphere through the first port 76. At the same time, pressurized air is supplied through the second port 78 to the intensifier retract chamber 34, urging the intensifier piston 30 upwardly toward the first manifold 16. If desired, a second work stroke can be performed by re-pressurizing the intensifier advance chamber 36 to further advance the work piston rod 118 downwardly. However, to retract the work piston rod 118, the reservoir air chamber 50 is vented to the atmosphere through the third port 80, while pressurized air is supplied to the piston air chamber 106 through the fifth port 122. As the work piston 98 moves upwardly, the water in the work chamber 74 and the piston water chamber 104 is displaced back into the reservoir water chamber 52.

As discussed above, the advance stroke is initiated by supplying pressurized air through the third port 80 to reservoir air chamber 50. As a result, the reservoir piston 44 is urged downwardly from the position illustrated in FIG. 1 toward the third manifold 22, as shown in FIG. 2. When pressurized air is supplied through the third port 80 to reservoir air chamber 50, the check valve 68 of the check valve assembly 60 is closed. Consequently, none of the pressurized air in the reservoir air chamber 50 can escape through the reservoir piston 44. When it is desired to retract the work piston 118, the reservoir air chamber 50 is vented to the atmosphere through the third port 80, as also discussed above. The check valve assembly 60 functions to maintain the pressure of the air located in the axial bore 66 and the radial bore 64 at atmospheric pressure, thereby preventing the accumulation of fluid pressure therein as a result of the reciprocating axial movement of the reservoir piston 44. As discussed above, the radial bore 64 extends from the outer annular space defined by the inner surface of the second tube 24, the outer surface of the reservoir piston 44, and the two seals 46 and 48 to the inner annular space defined by the inner surface of the reservoir piston 44, the outer surface of the intensifier piston rod 38, and the seals 56 and 58. Consequently, the pressure of the air located in these annular spaces are also maintained at atmospheric pressure.

As discussed above, the air pressure sensor 124, the flow rate sensor 126, and the displacement transducer 128 monitor certain operational characteristics of the intensifier 10 and generate electrical signals which are representative thereof. The signals from the sensors 124, 126, and 128 can be displayed in a conventional manner to permit the operating characteristics of the intensifier 10 to be monitored. If desired, the signals from the sensors 124, 126, and 128 can be fed to an electronic controller (not shown) for automatic statistical processing. Of course, the intensifier can be actuated without the aid of the sensors 124 and 128, and the displacement transducer 128.

In the illustrated embodiment, the air pressure sensor 124 measures the pressure of the air within the intensifier advance chamber 36. For the reasons set forth above, this measurement will yield a signal which is representative of the magnitude of the force exerted by the work piston rod 118 against the workpiece 140 during the work stroke of the intensifier 10. The air pressure sensor 124 can be embodied as any suitable sensor capable of measuring fluid pressure. The air pressure sensor 124 may, if desired, be located within the intensifier 10. Alternatively, the air pressure sensor 124 may be embodied as a liquid pressure sensor for sensing the pressure of the water within one of the water chambers within the intensifier 10.

In the illustrated embodiment, the flow rate sensor 126 measures the flow rate of the water flowing between the work chamber 74 and the piston water chamber 104. Because water is a relatively incompressible fluid, the rate of the water flowing between the work chamber 74 and the piston water chamber 104 is directly proportional to the velocity of the work piston 98 and the work piston rod 118 as they are moved during the approach and work strokes. Thus, the flow rate sensor 126 can be used to generate an electrical signal which is representative of the velocity of the work piston rod 118. The flow rate sensor 126 can be embodied in any suitable sensor capable of measuring fluid flow and may be located elsewhere in the intensifier 10 than as specifically shown in the drawings.

In the illustrated embodiment, the displacement transducer 128 measures the axial displacement of the wiper 136 relative to the mandrel 132, as described above. Because the wiper 136 is secured for axial movement with the work piston 98 and the mandrel 132 is fixed in position relative to the second body 14, the displacement transducer 128 can be used to generate an electrical signal which is representative of the actual position of the work piston 98 relative to the second body 14. As mentioned above, the displacement transducer 128 can be embodied as any suitable sensor capable of measuring the position of the work piston 98 relative to the second body 14. The displacement transducer 128 may also be located elsewhere in the intensifier than as specifically shown in the drawings.

Although the intensifier 10 is shown in FIGS. 1 through 3 having a first body 12 separate from a second body 14, the first and second bodies 12 and 14 can be incorporated into a single body. In such a case, the work chamber 74 and the piston water chamber 104 would form a single chamber defined between the work piston 98, the third mandrel 22, and a tube (not shown) connecting the third mandrel 22 to the fifth mandrel 92. Preferably, the first body 12 is separate from the second body 14 due to the co-axial positioning of the displacement transducer 128 at one end of the second body 14. By having two separate first and second bodies 12 and 14, the displacement transducer 128 can easily be mounted on and incorporated in the intensifier 10. Similarly, the flow rate sensor 126 can be easily incorporated into the intensifier for measuring the flow from the work chamber 74 to the piston water chamber 106.

In accordance with this invention, the reservoir water chamber 52, the work chamber 74, and the piston water chamber 104 are filled with water, a relatively incompressible liquid, as a working fluid for the chambers 52, 74, and 104. As discussed above, for certain applications, water is desirable over the use of other liquids, such has oil, because of its non-toxic and sterile properties. In the event that the water inadvertently leaks from the intensifier 10, the water will generally be less harmful to its surroundings than, for example, the leakage of oil, especially if the intensifier 10 is used in food preparation or medical equipment. Preferably, however, the various components and structures of the intensifier 10 are formed from materials or provided with coatings having anti-corrosive properties so that they will not corrode as a result on interaction with the water. Preferably, the tubes 20, 24, 28, and 94 are made of stainless steel or plastic. The manifolds 16, 18, 22, 26, 90, and 92 are preferably made of aluminum having an anodized coating. The intensifier piston 30, the intensifier rod 38, and the reservoir piston 44, and work piston 98 are preferably made of chrome plated steel or a stainless steel alloy.

Figure 4A:
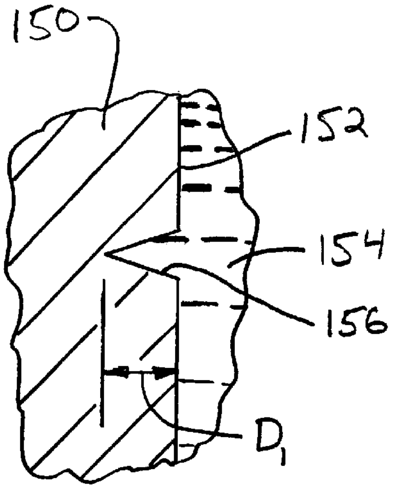
FIG. 4A PRIOR ART
FIG. 4A is an enlarged sectional view of a portion of a chamber wall of a prior art air/oil intensifier illustrating a helical groove formed therein.

As discussed above, to facilitate the lubrication of various seals of contained within the intensifier 10, it is known to form one or more helical grooves in the inner cylindrical surfaces of the walls defining the chambers containing incompressible fluid. FIG. 4A is an enlarged sectional view of a portion of a chamber wall 150 of a prior art air/oil intensifier having an inner cylindrical surface 152 that forms a boundary wall of a chamber in contact with oil 154. The oil is used as the working fluid of the prior art air/oil intensifier. As shown in FIG. 4A, one or more helical grooves 156 are formed or machined into the cylindrical surface 152. The helical grooves 156 are generally V-shaped in cross section and function to trap oil therein to lubricate the seal of a piston as the seal travels over the grooves. The grooves 156 have a depth $D_1$ in the range of from about ten microns to about fifteen microns. The grooves 156 are formed deep enough to trap enough oil to enable lubrication yet small enough not to form a significant communication path around the seals between adjacent chambers.

Figure 4B:
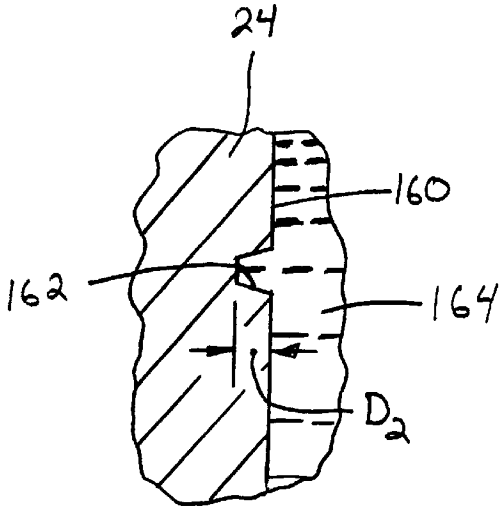
FIG. 4B is an enlarged sectional view of a portion of the surface of a tube of the intensifier of FIG. 1.

FIG. 4B is an enlarged sectional view of the hollow tube 24 of the intensifier 10 of this invention, including an inner cylindrical surface 160 having one or more helical grooves 162 (only one is illustrated) formed therein. Preferably, the tube 24 has a plurality of helical grooves 162 formed therein that are formed in both right-handed and left-handed orientation. The grooves 162 trap water 164 therein to lubricate the seals 46 and 48 of the reservoir piston 44 as the seals 46 and 48 travel over the grooves 162. The grooves 162 have a generally trapezoidal cross sectional shape and extend a depth $D_2$ in the range of from about five microns to about ten microns. The grooves 162 are formed deep enough to trap enough water therein to enable lubrication yet small enough not to form a significant communication path for the water to flow around the seals 46 and 48 between the reservoir air chamber 50 and the reservoir water chamber 52. Generally speaking, the viscosity of water is lower than the viscosity of most of the oils useable in prior art air/oil intensifiers. As a result, if water were used in an intensifier having grooves with a larger depth of $D_1$, as shown in FIG. 4A, a significant amount of water could leak through the grooves 156. The grooves 162 are, therefore, somewhat smaller in depth $D_2$ than the depth $D_1$ of the grooves 156. The depth and width of the grooves 162 cooperate to achieve an adequate exposed surface area for proper lubrication, yet a volume small enough to prevent a significant flow path. As shown in FIG. 4B the groove 162 has a blunted trapezoidal cross-sectional shape which provides the adequate surface area and relatively low depth and volume. The hollow tube 94 preferably has grooves formed therein similar in function and structure grooves 162 of the tube 24, as described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An intensifier comprising:

a body including first, second, third, and fourth manifolds, said first and second manifolds defining an intensifier chamber that is filled with a gaseous fluid, said second and third manifolds defining a reservoir chamber, and said third and fourth manifolds defining a work chamber that is filled with substantially all water;

an intensifier piston disposed within said intensifier chamber and having an intensifier rod secured thereto that extends through said second manifold into said reservoir chamber and is movable through said third manifold into said work chamber;

a reservoir piston disposed within said reservoir chamber and having a central opening formed therethrough through which said intensifier rod extends, said reservoir piston separating said reservoir chamber to define a water reservoir chamber that is filled with substantially all water and an air reservoir chamber that is filled with a gaseous fluid in selective communication with a source of a gaseous fluid;

a work piston disposed within said work chamber and having a work rod secured thereto that extends through said fourth manifold from said body; and a plurality of ports formed in said body for permitting the flow of said gaseous fluid and said water to and from said intensifier chamber, said reservoir chamber, and said work chamber to selectively move said work rod relative to said body.

2. The intensifier defined in claim 1 wherein said body has an inner surface defining a portion of said reservoir chamber, and wherein said surface has a groove formed therein.

3. The intensifier defined in claim 2 wherein said groove is generally trapezoidal in cross sectional shape.

4. The intensifier defined in claim 2 wherein said groove has a depth that is in the range of from about five microns to about ten microns.

5. The intensifier defined in claim 2 wherein said groove is generally trapezoidal in cross sectional shape, and wherein said groove has a depth that is in the range of from about five microns to about ten microns.

6. The intensifier defined in claim 1 wherein said body includes a plurality of tubes extending between said first, second, third, and fourth manifolds, and wherein said tubes are formed from stainless steel.

7. The intensifier defined in claim 1 wherein said body includes a plurality of tubes extending between said first, second, third, and fourth manifolds, and wherein said tubes are formed from plastic.

8. The intensifier defined in claim 1 wherein said first, second, third, and fourth manifolds are formed from aluminum having an anodized coating applied thereto.

9. The intensifier defined in claim 1 wherein said intensifier piston, said reservoir piston, and said work piston are formed from chrome plated steel.

10. An intensifier comprising:

a body including first, second, third, and fourth manifolds, said first and second manifolds defining an intensifier chamber, said second and third manifolds defining a reservoir chamber, and said third and fourth manifolds defining a work chamber, said body having an inner surface defining a portion of said reservoir chamber, said inner surface having a groove formed therein that is generally trapezoidal in cross sectional shape;

an intensifier piston disposed within said intensifier chamber and having an intensifier rod secured thereto that extends through said second manifold into said reservoir chamber and is movable through said third manifold into said work chamber;

a reservoir piston disposed within said reservoir chamber and having a central opening formed therethrough through which said intensifier rod extends, said reservoir piston separating said reservoir chamber to define a water reservoir chamber and an air reservoir chamber in selective communication with a source of air;

a work piston disposed within said work chamber and having a work rod secured thereto that extends through said fourth manifold from said body; and a plurality of ports formed in said body for permitting pressurized fluid to be selectively supplied to said intensifier chamber, said reservoir chamber, and said work chamber to selectively move said work rod relative to said body;

wherein said pressurized fluid supplied in said fluid reservoir chamber and said work chamber is water.

11. The intensifier defined in claim 10 wherein said groove has a depth that is in the range of from about five microns to about ten microns.

12. The intensifier defined in claim 10 wherein said groove is generally trapezoidal in cross sectional shape, and wherein said groove has a depth that is in the range of from about five microns to about ten microns.

13. The intensifier defined in claim 1 wherein said body includes a plurality of tubes extending between said first, second, third, and fourth manifolds, and wherein said tubes are formed from stainless steel.

14. The intensifier defined in claim 1 wherein said body includes a plurality of tubes extending between said first, second, third, and fourth manifolds, and wherein said tubes are formed from plastic.

15. The intensifier defined in claim 1 wherein said first, second, third, and fourth manifolds are formed from aluminum having an anodized coating applied thereto.

16. The intensifier defined in claim 1 wherein said intensifier piston, said reservoir piston, and said work piston are formed from chrome plated steel.

* * * * *